United States Patent
Bonnen et al.

(10) Patent No.: US 9,676,054 B2
(45) Date of Patent: Jun. 13, 2017

(54) ELECTRODE CARTRIDGE FOR PULSE WELDING

(71) Applicant: Ford Global Technologies, LLC, Dearborn, MI (US)

(72) Inventors: John Joseph Francis Bonnen, Milford, MI (US); Sergey Fedorovich Golovashchenko, Beverly Hills, MI (US); Alexander Mamutov, Dearborn, MI (US); Lloyd Douglas Maison, Brownstown Township, MI (US); Scott Alwyn Dawson, Royal Oak, MI (US); James deVries, Redford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 331 days.

(21) Appl. No.: 14/454,968

(22) Filed: Aug. 8, 2014

(65) Prior Publication Data
US 2016/0039041 A1    Feb. 11, 2016

(51) Int. Cl.
| | |
|---|---|
| *B23K 20/00* | (2006.01) |
| *B23K 20/06* | (2006.01) |
| *B23K 20/227* | (2006.01) |
| *B23K 20/233* | (2006.01) |
| B23K 101/06 | (2006.01) |
| B23K 103/10 | (2006.01) |
| B23K 103/20 | (2006.01) |

(52) U.S. Cl.
CPC .......... *B23K 20/06* (2013.01); *B23K 20/2275* (2013.01); *B23K 20/2336* (2013.01); *B23K 2201/06* (2013.01); *B23K 2203/10* (2013.01); *B23K 2203/20* (2013.01)

(58) Field of Classification Search
CPC  B23K 20/06; B23K 20/2275; B23K 20/2336; B23K 2203/20; B23K 2201/06; B23K 2203/10; B23K 20/02; B23K 20/002; B23K 31/02; B23K 13/01; H05B 6/36
USPC .......................... 228/115, 3.1, 234.1, 235.1
See application file for complete search history.

(56) References Cited

U.S. PATENT DOCUMENTS 3,441,190 A  *  4/1969  Stoeckel ................ B23K 20/06
                                                             228/5.1
3,502,840 A     3/1970  Khrenov et al.
(Continued)

FOREIGN PATENT DOCUMENTS

| EP | 1108768 A2 | 6/2001 |
| EP | 2803439 A1 | 11/2014 |

(Continued)

OTHER PUBLICATIONS

A. Vivek, et al., Journal of Materials Processing Technology, Vaporizing foil actuator: A tool for collision welding, Jul. 16, 2013.
(Continued)

*Primary Examiner* — Kiley Stoner
(74) *Attorney, Agent, or Firm* — Damian Porcari; Brooks Kushman P.C.

(57) ABSTRACT

A cartridge assembly for a tool includes a cartridge body or casing that contains a conductor. A conductor is connected to a pulse generator or source of stored charge that is discharged to vaporize the conductor and create an electro-hydraulic or electro-magnetic shockwave that is used to impact or pulse weld two parts together.

7 Claims, 2 Drawing Sheets

(56) References Cited

U.S. PATENT DOCUMENTS

| | | |
|---|---|---|
| 3,520,049 A | 7/1970 | Lysenko et al. |
| 3,528,596 A | 9/1970 | Carlson |
| 3,560,693 A | 2/1971 | Morin, Jr. |
| 3,603,759 A | 9/1971 | Peacock |
| 3,699,297 A | 10/1972 | Grin et al. |
| 3,857,265 A | 12/1974 | Howeler et al. |
| RE29,016 E | 10/1976 | Peacock |
| 4,103,813 A | 8/1978 | Debeir |
| 4,129,846 A | 12/1978 | Yablochnikov |
| 4,150,274 A | 4/1979 | Minin et al. |
| 4,205,422 A * | 6/1980 | Hardwick ............ B21D 39/066 228/107 |
| 4,504,714 A | 3/1985 | Katzenstein |
| 4,607,778 A | 8/1986 | Oakley et al. |
| 4,635,840 A | 1/1987 | Cenanovic |
| 5,824,998 A | 10/1998 | Livshiz et al. |
| 5,966,813 A | 10/1999 | Durand |
| 5,981,921 A | 11/1999 | Yablochnikov |
| 6,229,125 B1 | 5/2001 | Livshiz et al. |
| 6,234,375 B1 | 5/2001 | Durand |
| 6,255,631 B1 | 7/2001 | Kichline, Jr. et al. |
| 6,379,254 B1 | 4/2002 | Yablochnikov |
| 6,389,697 B1 | 5/2002 | Benoit et al. |
| 6,474,534 B2 | 11/2002 | Gabbianelli et al. |
| 6,561,722 B1 | 5/2003 | Dudko et al. |
| 6,693,251 B1 | 2/2004 | Ananthanarayanan et al. |
| 6,812,439 B1 | 11/2004 | Durand |
| 6,817,511 B2 | 11/2004 | Durand |
| 6,860,013 B1 | 3/2005 | Durand |
| 6,892,929 B2 | 5/2005 | Yablochnikov |
| 6,908,024 B2 | 6/2005 | Martin et al. |
| 6,910,617 B2 | 6/2005 | Yablochnikov |
| 6,921,013 B1 | 7/2005 | Kichline, Jr. et al. |
| 7,025,245 B2 | 4/2006 | Gust |
| 7,847,223 B2 | 12/2010 | Fischer et al. |
| 7,959,057 B2 | 6/2011 | Criqui |
| 8,360,301 B2 | 1/2013 | Danaj et al. |
| 8,393,525 B2 | 3/2013 | Gafri et al. |
| 8,667,823 B2 | 3/2014 | Golovashchenko |
| 9,266,190 B2 | 2/2016 | Bonnen et al. |
| 2003/0173355 A1 | 9/2003 | Yablochnikov |
| 2004/0074056 A1 | 4/2004 | Goetzinger et al. |
| 2004/0112942 A1 | 6/2004 | Durand |
| 2005/0051539 A1 | 3/2005 | Yablochnikov |
| 2005/0109769 A1 | 5/2005 | McClure et al. |
| 2005/0205553 A1 | 9/2005 | Cheng et al. |
| 2006/0081684 A1 | 4/2006 | Moore |
| 2006/0131300 A1 | 6/2006 | Yablochnikov |
| 2006/0138769 A1 | 6/2006 | Fischer |
| 2006/0144903 A1 | 7/2006 | Perry et al. |
| 2006/0185412 A1 | 8/2006 | Shao et al. |
| 2006/0208481 A1 | 9/2006 | Fischer et al. |
| 2006/0289479 A1 | 12/2006 | Gafri et al. |
| 2007/0240897 A1 | 10/2007 | Gafri et al. |
| 2008/0072584 A1 | 3/2008 | Cai et al. |
| 2008/0264130 A1 | 10/2008 | Blakely et al. |
| 2009/0050676 A1 | 2/2009 | Criqui |
| 2010/0108666 A1 | 5/2010 | Gafri et al. |
| 2010/0242284 A1 | 9/2010 | Danaj et al. |
| 2010/0294484 A1 | 11/2010 | Castillo et al. |
| 2011/0100979 A1 | 5/2011 | Keong et al. |
| 2012/0010709 A1 | 1/2012 | Wilson et al. |
| 2013/0067976 A1 * | 3/2013 | Golovashchenko . B21D 26/023 72/56 |
| 2013/0086961 A1 | 4/2013 | Yablochnikov et al. |
| 2013/0133542 A1 | 5/2013 | Morris et al. |
| 2013/0236244 A1 | 9/2013 | Yablochnikov et al. |
| 2014/0124075 A1 | 5/2014 | Smith et al. |
| 2014/0125024 A1 | 5/2014 | Deierling et al. |
| 2015/0328712 A1 | 11/2015 | Grubb |
| 2016/0001392 A1* | 1/2016 | Bonnen ................... B23K 20/06 228/115 |
| 2016/0039041 A1 | 2/2016 | Bonnen et al. |

FOREIGN PATENT DOCUMENTS

| | | | |
|---|---|---|---|
| FR | 2018826 A1 * | 6/1970 | ............ B21D 26/12 |
| FR | 2034088 A1 | 12/1970 | |
| FR | 2406454 A1 | 11/2001 | |
| JP | 5706021 B1 | 4/2015 | |
| WO | WO2007132468 A1 | 11/2007 | |

OTHER PUBLICATIONS

International Searching Authority, International Search Report for International Application No. PCT/US2015/33348 mailed Oct. 23, 2015.

* cited by examiner

ELECTRODE CARTRIDGE FOR PULSE WELDING

STATEMENT REGARDING FEDERALLY SPONSORED RESEARCH OR DEVELOPMENT

The invention was made with Government support under Contract No. DE-EE0006432 awarded by the Department of Energy. The Government has certain rights to the invention.

TECHNICAL FIELD

This disclosure relates to a fluid filled cartridge containing an electrode that forms a plasma when subjected to a high voltage discharge that is used to pulse weld parts together.

BACKGROUND

Parts made of aluminum and magnesium alloys in vehicle body architecture, especially in the passenger compartment safety cage, or greenhouse are used to reduce vehicle weight by including more lightweight alloys that may provide higher strength and increased stiffness. In some applications, lightweight alloy parts must be joined to high strength ferrous material parts to meet design and regulatory requirements. Dissimilar metal joints (such as boron steel to 6xxx series aluminum) are may be specified in structures that are subject to stringent safety standards.

Mechanical joints, such as rivets or clinch joints, may be used to join dissimilar materials but the strength, durability, and corrosion resistance of such joints does not equal the properties of welds between mild steel parts.

Extrusions and hydro-formed parts are advantageously used for the safety cage and specifically the roof rail Body-In-White (BIW) construction because they can offer very high stiffness and improve material utilization compared to assemblies of sheet metal parts with welded flanges. A major roadblock to broad implementation of extrusions and hydro-formed parts is the lack of affordable mass production joining methods to assemble these parts into BIW structures. Joining methods such a resistance welding, MIG welding, TIG welding, friction welding, and spin stir welding generate heat that may introduce dimensional distortion and may detrimentally impact the microstructure or material properties of the parts made of special heat treatable alloys.

Several different types of joining methods are currently available and may be categorized as one-sided or two-sided methods. One-sided joining methods are critical to the implementation of extrusion to extrusion joining because of access problems relating to the closed internal voids in some extrusions. One-sided joining methods such as flow drill screws add cost to the assemblies and are not well suited to high strength steel parts. Two-sided joining methods such as self-piercing rivets and clinch joints require access to the back side of a joint and are difficult to use in some applications where extrusions or tubular parts are joined.

The above problems and other problems are addressed by this disclosure as summarized below.

SUMMARY

Pulsed joining methods (or high velocity impact welding) do not suffer from the above deficiencies. High strength/high quality dissimilar metal joints/welds formed by high velocity impact welding do not generate a significant amount of heat and leave the materials largely unchanged. Electro-hydraulic (EH) and electro-magnetic (EM) forces may be used alone or in combination to provide an impulse that causes limited localized heating and solid state mixing of the materials. Pulsed joining methods yield very high strength joints that are largely free of defects. However, the impacted elements of the structure must be supported to prevent excessive deformation.

This disclosure contains concepts for implementing one-sided pulse welding of dissimilar materials in hard-to-access locations on extrusions. Disposable, self-contained cartridges contain a conductor that is vaporized to create an electro-magnetic/electro-hydraulic pulse that is applied to parts that are placed in a fixture that clamps the parts to be joined. Pulse welds can be created between parts made of dissimilar materials in difficult to access locations.

According to one aspect of this disclosure, a cartridge assembly is provided for pulse welding a first tube to a second tube. The cartridge is assembled to the first tube and a tool is assembled to the second tube. The cartridge assembly comprises a casing that defines a cavity with a fluid filling the cavity. A conductor is disposed in the cavity near a wall of the casing and a stored charge is discharged through the conductor to electro-hydraulically act on the first tube and pulse weld the first tube to the second tube.

According to other aspects of this disclosure, the casing is enclosed within the first tube when the source of stored energy is discharged. The conductor is a metal coil that generates an electro-magnetic pulse against the first tube that drives the first tube into the second tube. The electro-magnetic pulse kinetically drives the first tube toward the second tube to form an impact weld joining the first tube to the second tube. The conductor is a metal foil that generates an electro-magnetic pulse against the first tube that drives the first tube into the second tube.

The casing is formed from a relatively incompressible Newtonian material that transmits hydraulic pressure when the conductor is discharged to the first tube. The incompressible material may consist essentially of water, wax, oil, or grease.

According to another aspect of this disclosure, a cartridge assembly is disclosed for a tool that defines a chamber having an open side, and a closure member for clamping a part over the open side. The cartridge assembly comprises a cartridge body and a conductor disposed in the cartridge body near the open side. A stored charge is discharged through a conductor to electro-hydraulically displace a portion of a wall of a tube to pulse weld the tube to the part.

According to further aspects of this disclosure, the conductor may be a metal coil that generates an electro-magnetic pulse against the tube that drives the wall of the tube into the part. The electro-magnetic pulse drives the outer tube kinetically toward the inner tube to form an impact weld joining the outer tube to the inner tube. The conductor may be a metal foil that generates an electro-magnetic pulse against the tube that drives the tube into the part.

The casing may be formed from a relatively incompressible material, or Newtonian material, that is sufficiently incompressible to transmit a shock wave generated by the discharge from the fluid to the wall of the tube. For example, the incompressible material may be water or a polyurethane based composition.

According to another aspect of this disclosure a method is disclosed for joining a tubular member to a part. The method includes the steps of inserting a conductor contained within a cartridge into a selected area of the tubular member. Assembling the part against the selected area and assembling a clamp against the part. A stored electrical charge is discharged through the conductor to vaporize the conductor that drives the selected area of the tubular member into the part and forms a pulse weld between the tubular member and the part.

The cartridge further comprises a casing that is filled with a liquid, wherein the method further comprises pre-assembling the conductor and the liquid into a casing with the cartridge enclosing the conductor and the liquid, and wherein the discharging step further comprises transmitting energy from the discharge through the water, the cartridge, the tubular member and to the part.

The step of inserting the cartridge at the selected area into the tubular member is performed with the clamp in an open position and the step of assembling the part is followed by the step of assembling the clamp against the part.

The conductor may be a single winding of wire and the step of discharging a stored electrical charge vaporizes the wire and exerts an electro-hydraulic and an electromagnetic force on the selected area of the tubular member.

The above aspects of this disclosure and other aspects will be described below in greater detail with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
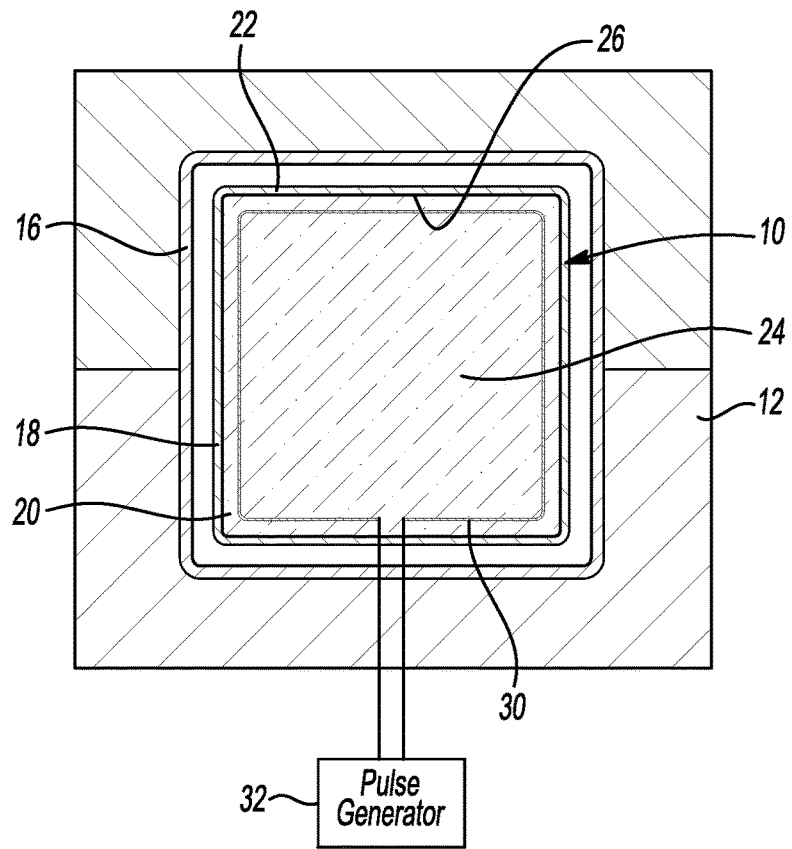
FIG. 1 is a diagrammatic cross-section view showing an electro-hydraulic/electro-mechanical (EH/EM) tool and cartridge with a pair of tubular members in position to be pulse welded together.
Figure 2:
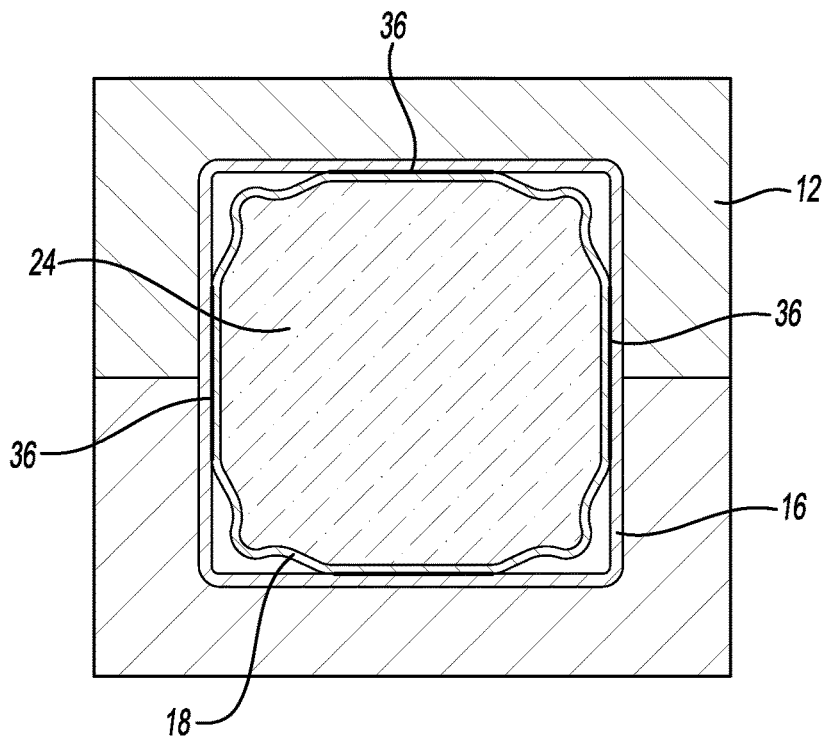
FIG. 2 is a diagrammatic cross-section view showing an EH/EM tool and cartridge after pulse welding the pair of tubular members together.

Referring to FIGS. 1 and 2, a cartridge assembly 10 is shown disposed in a clamping tool 12. The cartridge assembly 10 is a single-use, or disposable, cartridge that is discharged once to create an impact weld or pulse weld between an outer tube 16 and an inner tube 18.

In the embodiment illustrated in FIGS. 1 and 2, the cartridge assembly 10 may include a casing 20 that includes a plurality of walls for containing a liquid 24. The structure of the cartridge assembly 10 alternatively may be a solid member made of a material having a high Poison's Ratio, such as a dense wax, polymer or grease that is well adapted to transmit a pulse or impact.

A cavity 26 is defined by the clamping tool 12 and the cartridge assembly 10 is inserted into the cavity 26. In the illustrated embodiment, the cartridge is received inside the inner tube 18 that is, in turn, received within the outer tube 16. The clamping tool 12 constrains the outer tube 16 from moving when the cartridge is discharged.

The cartridge includes a conductor 30 that may be formed from a coil of wire or a metal foil. The conductor 30 is connected to a pulse generator 32, or source of stored charge. The pulse generator 32 may be a bank of capacitors or inductors that are discharged to provide a high voltage spike to the conductor 30 that vaporizes the conductor 30. Vaporizing the conductor 30 creates a shockwave that may be an electro-hydraulic shockwave, an electro-magnetic shockwave, or a combined electro-hydraulic/electro-magnetic shockwave, or pulse. When the pulse generator 32 is discharged through the conductor 30, the electro-magnetic or electro-hydraulic shockwave is transmitted either through the liquid 24 or the solid body of the cartridge assembly. The shockwave is transmitted to the inner tube 18 in the embodiment illustrated in FIGS. 1 and 2 to form an impact weld 36 when the inner tube 18 is driven into the outer tube 16.

As shown in FIG. 2, impact welds 36 are formed on each of the four sides of the outer and tubes 16, 18. The corners of the inner tube 18 are not driven completely into the corners of the outer tube 16. The impact welds 36 may be formed between dissimilar materials and are not subject to distortion like conventional resistance welds, MIG welds, TIG welds, or friction welds. The weld created by the cartridge assembly may be referred to as an impact weld or a pulse weld that is formed when the inner tube 18 is driven into the outer tube 16.

The cartridge assembly can be used, for example, to weld aluminum to steel or aluminum to aluminum. The resultant weld has less inter-metallics that are microscopic ceramic formations caused by heating metal alloys. The cartridge assembly may be used to weld conventional tubes or extruded tubes. While the embodiments shown in FIGS. 1 and 2 illustrates a cartridge disposed within the tubes and a clamp supporting the outer tube, an alternative embodiment of the invention would be to provide a cartridge assembly outside the tubes that forms an impact weld when the cartridge is discharged to drive the outer tube 16 into the inner tube 18.

Figure 3:
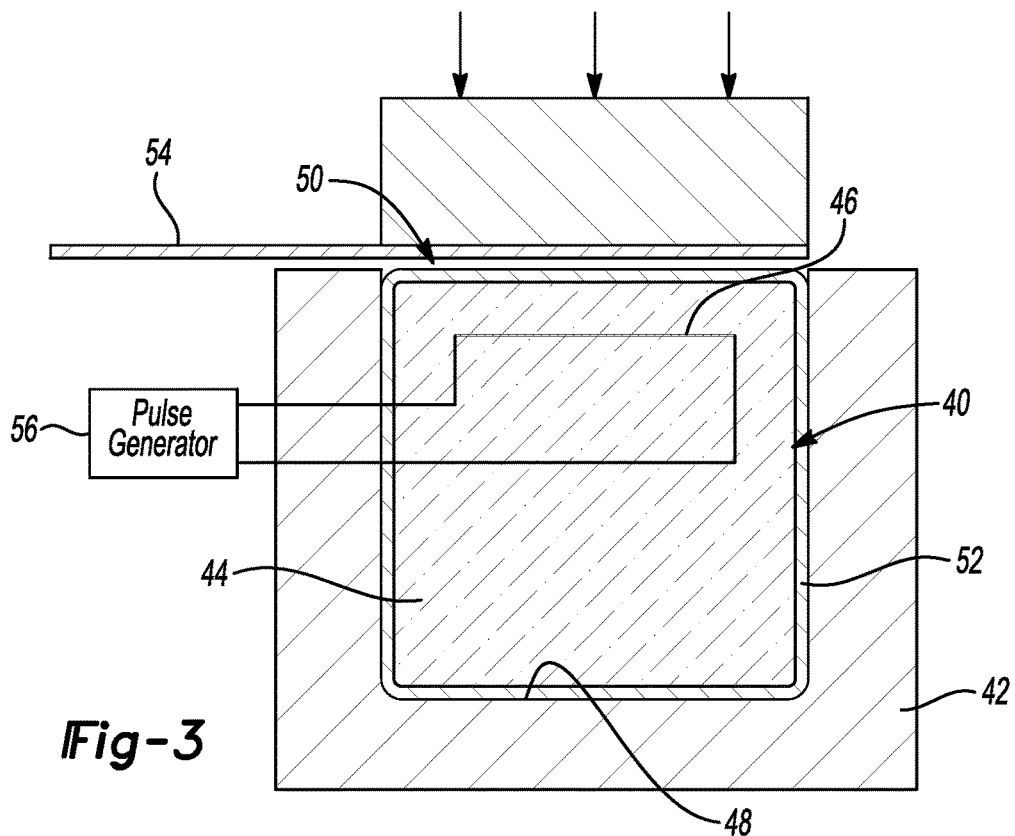
FIG. 3 is a diagrammatic cross-section view showing an EH/EM tool and cartridge with a tubular member and a second part in position to be pulse welded together.
Figure 4:
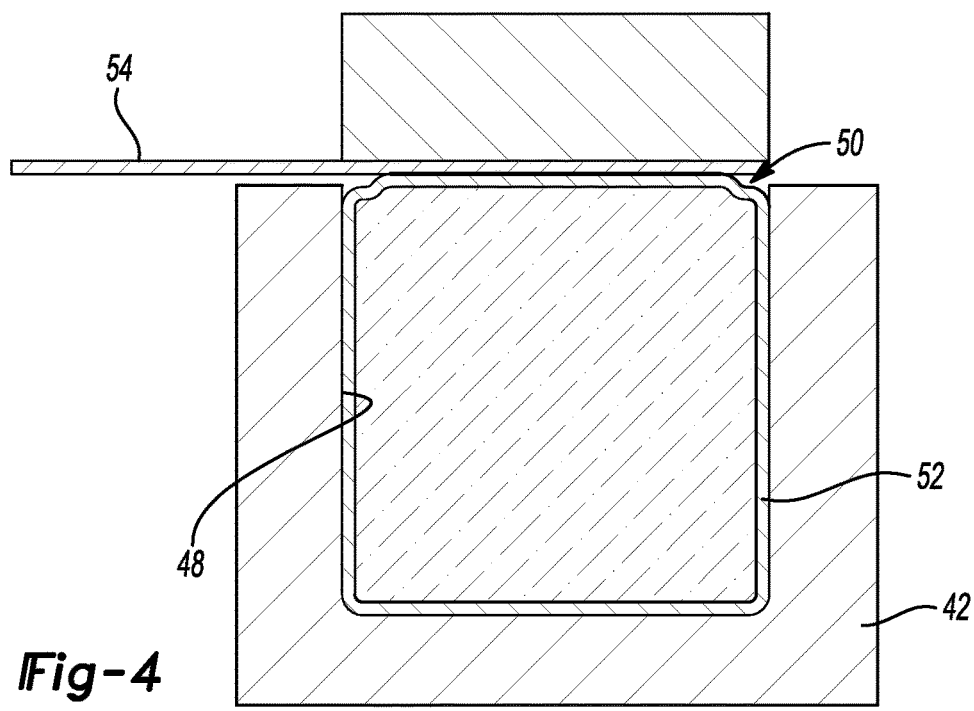
FIG. 4 is a diagrammatic cross-section view showing an EH/EM tool and cartridge with a tubular member and a second part after pulse welding the tubular member and part together.

Referring to FIGS. 3 and 4, an alternative embodiment of the cartridge assembly 40 is shown disposed in a tool 42. The cartridge assembly 40 includes a cartridge body 44 and a conductor 46 that is contained within the cartridge body 44. The cartridge assembly 40 is disposed in a chamber 48 defined by the tool 42 that has an open side 50. The cartridge assembly 40 is received in a first tubular part 52 and is assembled into the tool 42 through the open side 50 with the conductor 46 positioned adjacent the open side 50. A second part 54, such as a sheet metal part or an extrusion, is assembled over the open side 50 of the chamber 48.

A pulse generator 56 is discharged to vaporize the conductor 46 by providing a high voltage spike from the pulse generator 56 to the conductor 46. The conductor 46 creates an electro-hydraulic shockwave, an electro-magnetic shockwave, or a combined electro-hydraulic/electro-magnetic shockwave. The shockwave is transmitted through the cartridge body 44. The first tubular part 52 and second part 54 are joined by a pulse weld 58 that is formed by the impact of the first tubular part 52 against the side facing the second part 54. The cartridge body 44 may be a material having a high Poison's Ratio, such as wax, a polyurethane polymer, grease, or the like, having a hardness of <85 on the Shore A scale.

As an alternative, the cartridge body may include a casing that is filled with a liquid, such as water or another Newtonian fluid. Water is one example of a Newtonian fluid that is not compressible. The shockwave is transmitted through the Newtonian fluid to create the pulse weld 58 between the first tubular part 52 and the second part 54. The first tubular part 52 and second part 54 may be of dissimilar material, such as aluminum and steel or may be an aluminum to aluminum weld. The tubular part 52 and the second part 54 may be extruded parts that are otherwise difficult to join together by welding with conventional welds.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A cartridge assembly for a pulse welding first and second tubes, a tool assembled to the second tube, the cartridge assembly comprising:
    a casing that defines a cavity, wherein the casing is enclosed within the first tube;
    a fluid filling the cavity; and
    a conductor disposed in the cavity, wherein a stored charge is discharged through the conductor to electro-hydraulically act on the first tube and pulse weld the first and second tubes together.

2. The cartridge assembly of claim 1 wherein the conductor is a metal coil that generates an electro-magnetic pulse against the first tube that drives the first tube into the second tube.

3. The cartridge assembly of claim 2 wherein the electro-magnetic pulse kinetically drives the first tube toward the second tube to form an impact weld joining the first tube to the second tube.

4. The cartridge assembly of claim 1 wherein the conductor is a metal foil that generates an electro-magnetic pulse against the first tube that drives the first tube into the second tube.

5. The cartridge assembly of claim 1 wherein the casing is formed from a fluid material that transmits hydraulic pressure to the first tube when the conductor is discharged.

6. The cartridge assembly of claim 5 wherein the fluid material is selected from a group consisting essentially of:
    water;
    oil; and
    grease.

7. The cartridge assembly of claim 5 wherein the conductor is vaporized when the stored charge is discharged into the conductor.

* * * * *